United States Patent [19]

Patel

[11] 4,421,700

[45] Dec. 20, 1983

[54] METHOD AND TECHNIQUE FOR INSTALLING LIGHT-WEIGHT, FRAGILE, HIGH-TEMPERATURE FIBER INSULATION

[75] Inventor: Bhanu C. Patel, Northridge, Calif.

[73] Assignee: The United States of America as represented by the Administrator of the National Aeronautics and Space Administration, Washington, D.C.

[21] Appl. No.: 361,711

[22] Filed: Mar. 25, 1982

Related U.S. Application Data

[63] Continuation of Ser. No. 185,868, Sep. 11, 1980, abandoned, and Ser. No. 969,757, Dec. 15, 1979, abandoned.

[51] Int. Cl.$^3$ .............................................. C04B 33/32
[52] U.S. Cl. ....................................... 264/59; 264/60; 264/118; 264/119
[58] Field of Search ................... 264/118, 119, 44, 60, 264/59

[56] References Cited

U.S. PATENT DOCUMENTS 2,607,714  8/1952  Smucker ............................. 264/109
3,546,846 12/1970  Sens ..................................... 425/308

Primary Examiner—James R. Hall
Attorney, Agent, or Firm—Marvin F. Matthews; John R. Manning

[57] ABSTRACT

A method of installing fragile, light-weight, high-temperature fiber insulation, particularly where the insulation is to be used as a seal strip providing a high order of thermal barrier insulation. The process is based on provision of a strip of the mineral batting cut oversize by a predetermined amount, saturated in a fugitive polymer solution, compressed in a mold, dried and cured to form a rigidized batting material which may be machined to required shape. The machine dimensions would normally be at least nominally less than the dimensions of the cavity to be sealed. After insertion in the cavity, which may be a wire-mesh seal enclosure, the apparatus is subjected to baking at a temperature sufficiently high to cause the resin to burn off cleanly, leaving the batting substantially in its original condition and expanded into the cavity or seal enclosure.

6 Claims, 3 Drawing Figures

METHOD AND TECHNIQUE FOR INSTALLING LIGHT-WEIGHT, FRAGILE, HIGH-TEMPERATURE FIBER INSULATION

ORIGIN OF INVENTION

The invention described herein was made in the performance of work under a NASA contract and is subject to the provisions of Section 305 of the National Aeronautics and Space Act of 1958, Public Law 85-368 (72 Stat. 435; 42 U.S.C. 2457).

This is a continuation of application Ser. Nos. 969,757 and 185,868 filed Dec. 15, 1978 and Sept. 11, 1980 both now abandoned.

BACKGROUND OF THE INVENTION

1. Field of the Invention

The field of art to which the invention pertains generally, is the field of insulation installation, and more particularly, to installation of fragile fibrous, high-temperature insulation used as a high-temperature seal.

2. Description of the Prior Art

The concept of employing fugitive binders is known, per se, and has been employed in the ceramics industry. In the ceramics industry, intense heating or baking (firing) can be relied upon to evolve or drive off fugitive binder materials used for temporary convenience during manufacturing. In general, the fugitive binder material, per se, is not used to preform a compressible fibrous material in reduced volume, however.

In U.S. Pat. No. 2,607,714 temporarily fabricated inorganic fiber shapes are described. The fiber materials are recognized as fragile and subject to damage in normal handling, transportation and application. For the purpose, a temporary adhesive material is applied to preserve the shape of the material, such as fiberglass, etc., and when in place in their intended use, the adhesive is flushed from the material, using a non-contaminating solvent, for example, water. A suggested fugitive adhesive or binder in that reference is hydroxyethyl cellulose, which is readily soluble in cold water.

In U.S. Pat. No. 3,546,846, there is described a method and apparatus for packaging individual lengths of compressible integrated glass fiber mats. A length of such a fiberglass mat is compressed without breaking individual glass fibers in the mat by evacuating air from within it. An air impervious backing and top cover are then sealed together to retain the mat in its evacuated and compressed state. That reference may be thought of as describing an alternative "packaging" method for the fibrous insulation material, however, steps for the restoration of insulation material volume in order to have it fill voids or cavities into which it is emplaced, is not evident. Presumably, however, puncture of the packaging would permit expansion of the mats.

None of the aforementioned methods and apparatus provide a satisfactory method for inserting light-weight batting of fragile, high-temperature mineral fibers into assembly such as special fabric covered nozzle seals or wire sleeving.

In accordance with the foregoing, the manner in which the present invention provides a unique process for forming heat-barrier seals which are readily handled and installed without disintegrating the fibrous structure thereof, will be understood as this description proceeds.

SUMMARY OF THE INVENTION

According to the invention, light-weight insulation batting such as alumina/zirconia, or preferably, saffil high-temperature alumina fiber is precut into oversize elongated shapes. These shapes are saturated in an acrylic polymer resin in water solution, and compressed in a mold to the required thickness or cross-sectional dimensions. The saturated batting is then dried in the mold and the resin cured at an appropriate temperature. The resulting rigidized batting may then be machined to a particular required shape and required dimensions for installation in wire-mesh sleeving, or any cavity requiring the heat-barrier seal to be provided. The entire assembly is subsequently heated to a temperature much greater than the resin curing temperature to effect a clean burn-off of the resin material, leaving the original mineral batting material to expand into the interior shape of the containing cavity or wire-mesh sleeving if the insulation material is to be used as a heat seal around an openable door or hatch, for example.

In connection with certain recoverable space vehicles, high performance heat-sealing must be provided in places such as entry hatches, landing gear doors, etc., since the vehicle skin temperatures become extremely high during certain times in the atmospheric re-entry and the return maneuvers. The method, which is the subject of the present invention, is particularly well adapted for that purpose as will be more fully understood as this description proceeds.

DESCRIPTION OF THE PREFERRED EMBODIMENTS

Figure 1:
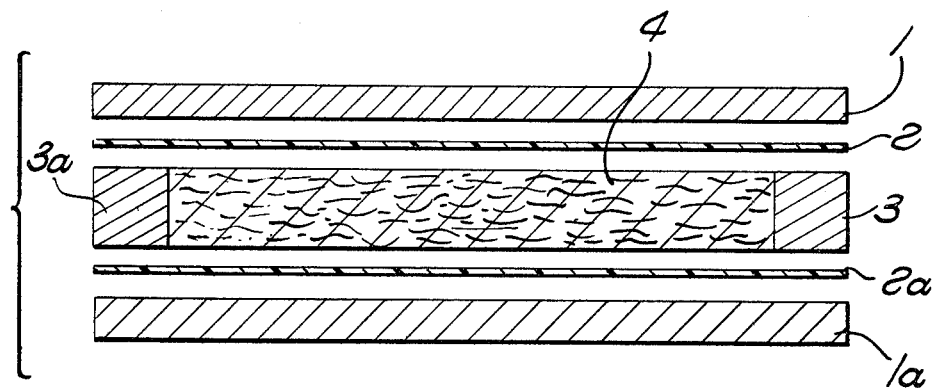
FIG. 1 is an exploded view in longitudinal cross-section of a compression tooling used in the rigidizing step according to the invention for producing a fiber strip of essentially rectangular cross-sectional shape.

The method of the invention will be described with particular reference to the aerospace application aforementioned, and the materials referred to will be those appropriate to that application. It is to be understood however, that other less exotic materials might be substituted in less demanding industrial applications.

Before referring to the drawings in detail, it must be first realized that a roughly cut elongated shape of the saffil high-temperature alumina fibrous material is first provided. The size of such a strip exceeds the cavity into which it is to be placed, since in the final analysis it will have been permitted to expand and fill the said cavity completely.

Figure 2:
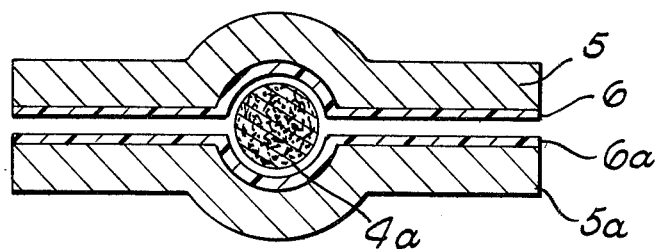
FIG. 2 is a transverse cross-sectional view of another form of tooling used in the rigidizing process according to the invention, for the production of an elongate rigidized batting of circular cross-section.

The pre-cut or roughly cut alumina batting strip is next saturated in the acrylic polymer resin solution, for example, a material identified as A-3 as manufactured by Rohm and Haas Company. That material is prepared in a water solution, preferably with distilled water, diluted to about five percent solid content. Saturation of the fiber batting in that solution is a simple matter requiring only its immersion in the solution. The saturated fiber strips are then placed in the compression tool which may be relatively simple, and will vary in shape according to the application. FIGS. 1 and 2 illustrate tooling suitable for this compression step and will be described hereinafter. The compression provided by the tooling not only compresses the fibrous batting to a dimension in accordance with which it is easily placed in the cavity or wire sleeve for which it is intended, but also serves to squeeze out of the compression mold resin solution. The compressed bats are allowed to remain in the compression fixture, typically for a time of sixteen hours or more at ambient temperatures. Without removing the compressed bats from the fixture, the resin is next cured in a pre-heated air-circulating oven preferably at 250° F.±10°. The curing-drying time at that temperature is continued for a time dependent upon the size of the batting strip being processed, but ordinarily for a period on the order of four to eight hours.

Disassembly of the fixture and removal of the cured compressed batting strip is undertaken when cooling to 150° (F.) or below has occurred.

Referring now to FIG. 1, an axially or longitudinally sectioned view of typical tooling (fixture) for producing a fiber strip of essentially rectangular cross-sectional shape is shown. A solution impregnated fiber material (shown in the compressed shape for convenience) is essentially inserted between two caul plates, 1 and 1a with separator films, 2 and 2a between, as shown. These separator films might be of a fluorocarbon or fiberglass material to avoid adherence of the compressed fibrous material strip to the caul plates 1 and 1a, the latter being metal plates ordinarily. Spacer blocks 3 and 3a are used to predetermine the length of each compressed fibrous material strip produced, although the impregnated compressed and cured material can be cut to length if it is processed without spacers 3 and 3a according to FIG. 1.

Referring now to FIG. 2, an equivalent tooling for producing the compressed fibrous strip 4a in circular cross-section is shown. The caul plates 5 and 5a are appropriately shaped and the separator films 6 and 6a are similarly shaped or may be of a sprayed on fluorocarbon material equivalent in composition and function to films 2 and 2a of FIG. 1.

Figure 3:
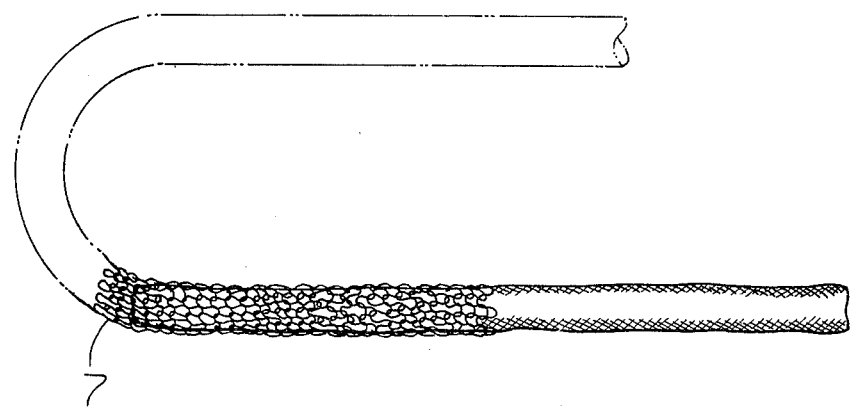
FIG. 3 shows the step of inserting a rigidized resin-filled fiber member into a wire sleeve.

Referring now to FIG. 3, a compressed and cured fibrous insulation member as might have been produced by the fixture of FIG. 2 is shown being inserted into a tubular-shaped with mesh. Sufficient clearance is extant to permit easy insertion of the stiffened fibrous strip 4a into the wire sleeve 7.

Once the element 4a has been fully inserted into wire sleeve 7, that assembly is baked or fired at a temperature on the order of 800° F. The organic resin binder being thoroughly and cleanly driven off. In the absence of the fugitive binder material, the batting expands to uniformly and completely fill the wire mesh sleeving, the resulting product being easily handled and effectively contained for emplacement as a door heat-sealing material, or the like.

In the event that the shaped rigidized batting is to be placed in a structural cavity directly, it can be cut, milled or otherwise machined in this rigidized form to effect conformance to the said cavity.

The method of the invention permits rapid and improved placement of light-weight thermo-barrier insulation batting with substantially no hazard of damage to the fiber and with minimal labor expenditure. The 800° F. firing step for driving off the fugitive binder is, of course, applied in all cases as a final step.

The process will be recognized as basically applicable to the production of improved heat-barriers and seals, such as might be required in industrial ovens, autoclaves, kilns, and the like.

I claim:

1. A method of installing light-weight, fragile, high-temperature fiber insulation, comprising:
    preforming a roughly dimensioned shape of said insulation oversized in at least one dimension in respect to a cavity into which said insulation is to be placed;
    saturating said shape with an aqueous solution of an acrylic polymer resin curable at a first temperature to form a relatively rigid mass and substantially completely fugitive at a second higher temperature;
    compressing said saturated mass to form a shape undersized with respect to said cavity;
    drying said undersized shape and curing it at said first temperature to form said rigid mass;
    emplacing said rigid mass in said cavity to form an assembly;
    and baking said assembly at said second temperature to drive off said resin thereby releasing said fiber insulation to expand and substantially fill said cavity.

2. The method according to claim 1 in which said first temperature is defined as 250° F. within a nominal tolerance and said second temperature is defined as 800° F. within a nominal tolerance.

3. The method according to claim 1 in which said step of compressing is such as to force out excess resin from said fiber insulation.

4. A method for installation of fragile, high-temperature mineral fiber insulation in cavities to be insulated, comprising the steps of:
    preforming a roughly dimensioned mat of said fiber insulation, said mat being oversized in respect to the dimensions of said cavity;
    saturating said fiber with an aqueous solution of acrylic polymer resin which is fugitive at a second temperature substantially higher than a first temperature for curing;
    compressing and holding said saturated fiber in a fixture and drying and curing said saturated fiber in said fixture at said first temperature to produce a rigidized mass;
    machining said rigidized mass to dimensions permitting easy fit into a cavity to be insulated;
    and baking said rigidized mass in place in said cavity to drive off said acrylic polymer resin, thereby to release said fiber and permit its expansion into said cavity.

5. The method according to claim 4 in which said first and second temperatures are approximately 250° F. and 800° F., respectively.

6. The method according to claim 4 in which said aqueous polymer solution is approximately five percent solid material.

* * * * *